United States Patent
Quan

(10) Patent No.: US 6,711,261 B1
(45) Date of Patent: Mar. 23, 2004

(54) ENHANCING CONCEALMENT IN THE PRESENCE OF FINE MISTUNING FOR VARIOUS TV SCRAMBLING TECHNIQUES

(75) Inventor: Ronald Quan, Cupertino, CA (US)

(73) Assignee: Macrovision Corp, Santa Clara, CA (US)

(*) Notice: Subject to any disclaimer, the term of this patent is extended or adjusted under 35 U.S.C. 154(b) by 0 days.

(21) Appl. No.: 09/356,798

(22) Filed: Jul. 20, 1999

Related U.S. Application Data

(60) Provisional application No. 60/093,694, filed on Jul. 22, 1998, and provisional application No. 60/108,182, filed on Nov. 11, 1998.

(51) Int. Cl.$^7$ ............................................. H04N 7/167
(52) U.S. Cl. ................ 380/210; 380/218; 380/221; 380/240; 380/242; 358/400; 358/402; 725/76; 725/82; 725/91; 725/39; 725/68
(58) Field of Search .................. 380/210, 218, 380/221, 240, 242, 234; 358/86, 246, 400, 402; 340/825.22, 825.28; 725/76, 82, 91, 151

(56) References Cited

U.S. PATENT DOCUMENTS

| | | | | |
|---|---|---|---|---|
| 4,691,351 A | * | 9/1987 | Hayashi et al. | 380/242 |
| 4,887,152 A | * | 12/1989 | Matsuzaki et al. | 725/76 |
| 5,438,620 A | * | 8/1995 | Ryan et al. | 380/218 |
| 5,844,988 A | * | 12/1998 | Ryan et al. | 380/218 |
| 6,009,172 A | * | 12/1999 | Kurowski et al. | 380/218 |
| 6,014,228 A | * | 1/2000 | Castro | 358/400 |
| 6,459,795 B1 | * | 10/2002 | Quan | 380/221 |

FOREIGN PATENT DOCUMENTS

| WO | WO91/16791 | 10/1991 | |
|---|---|---|---|
| WO | WO 98 42130 | 9/1998 | 7/171 |

\* cited by examiner

*Primary Examiner*—Ly V. Hua
(74) *Attorney, Agent, or Firm*—George Almeida

(57) ABSTRACT

An improved method and apparatus for maintaining concealment for a scrambled signal when frequency pre-emphasis is used to defeat the scrambling. The pre-emphasis may be synthesized with high pass or peaking circuitry. More commonly however the pre-emphasis is available in television sets with a fine tuning control. By adjusting the fine tuning control to cause purposely mistuning off center, a peaking effect is generated which is used to counter the scrambled signal. The application discloses one embodiment which uses de-emphasis to counter the peaking effect. In another embodiment, signals added in the vicinity of the horizontal blanking interval causes the peaking effect to enhance these added signals over stable edges of the video signal. Since these added signals are position modulated for example, the television's sync circuits and horizontal oscillator circuits will cause scan circuits to generate position modulation. Thus adding a specific type of signal causes the peaking circuit to enlarge the added signals more than the other parts of the video signal for synchronization.

32 Claims, 16 Drawing Sheets

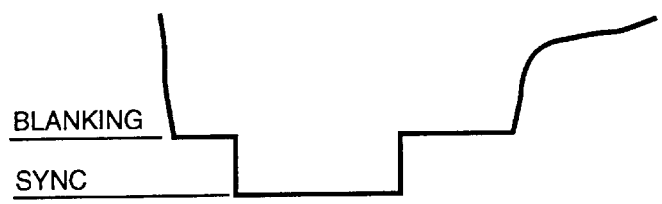
FIG. 2A
(PRIOR ART)
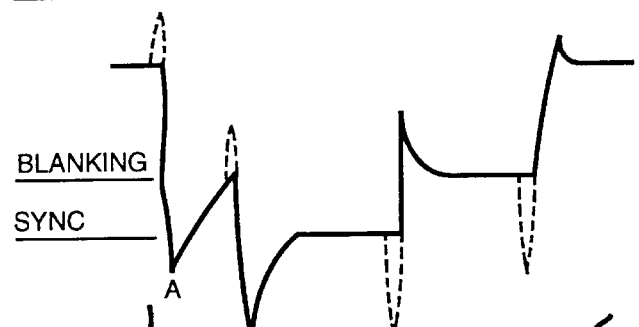
FIG. 2B
FIG. 2C
(PRIOR ART)
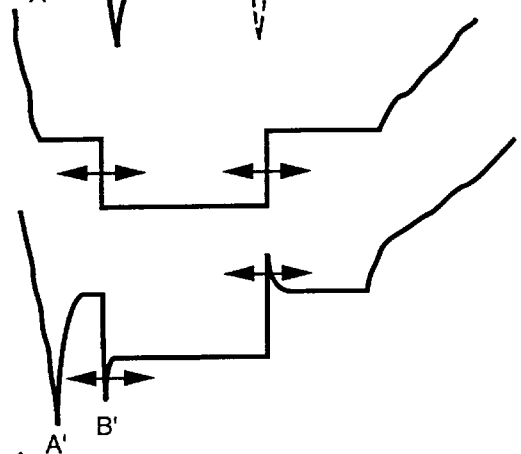
FIG. 2D
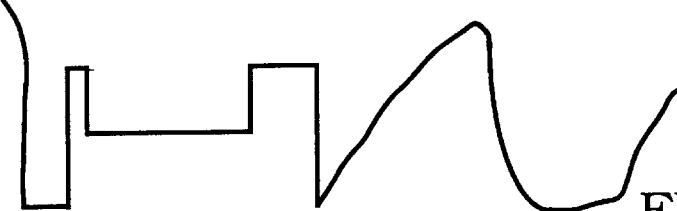
FIG. 2E
(PRIOR ART)
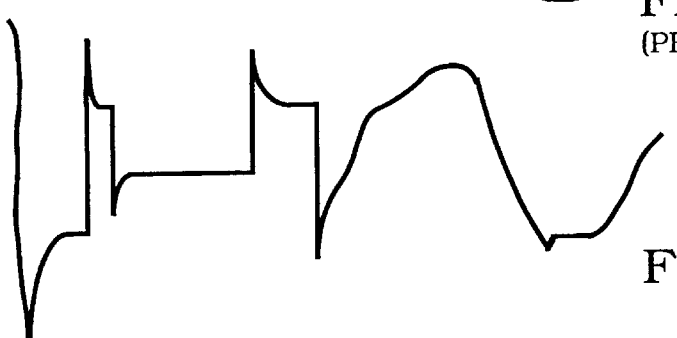
FIG. 2F

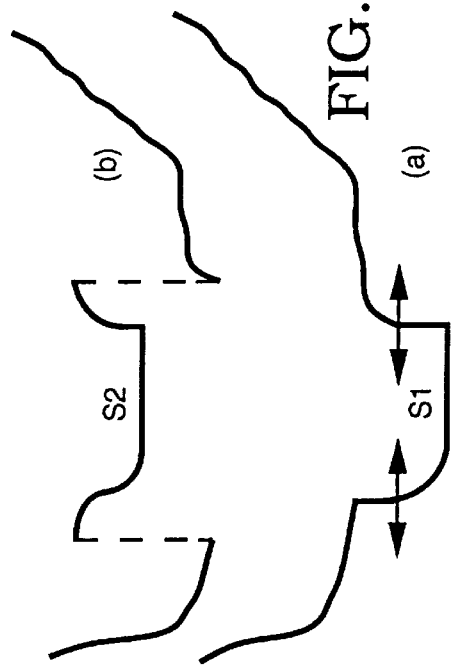
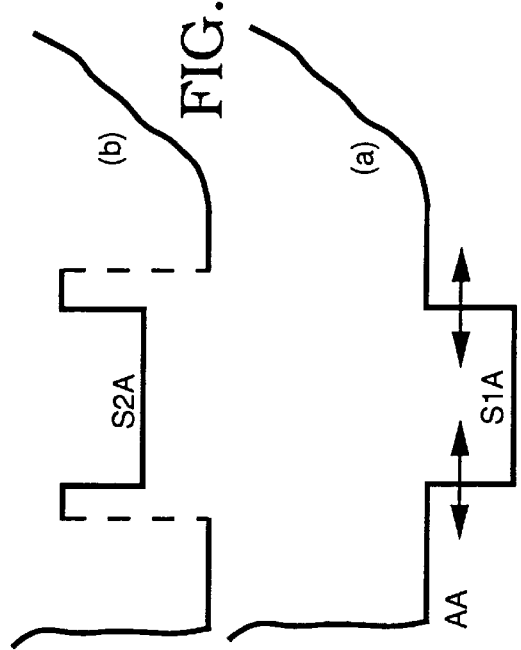
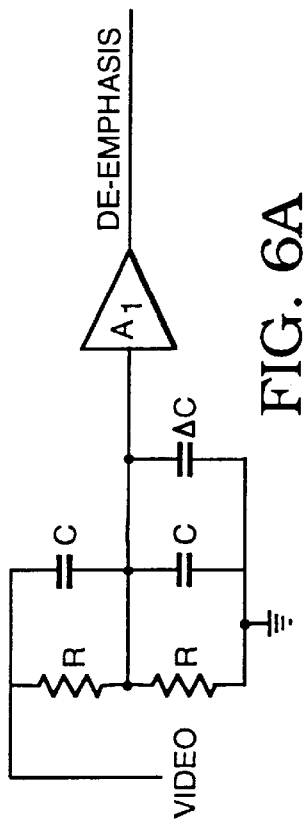
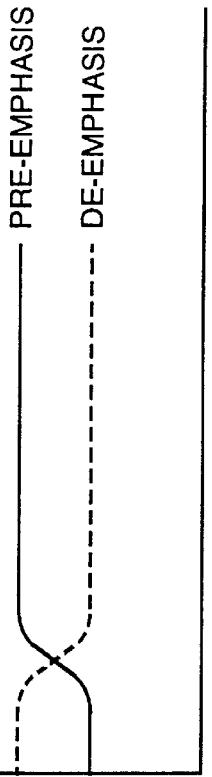
FIG. 6A
FIG. 6B
FIG. 6C
FIG. 6D
FIG. 6E

FIG. 9A  OS 92

FIG. 9B  WAV1

FIG. 9C  NEW SYNC

FIG. 9D  NEW BURST

FIG. 9E  ECP

FIG. 9F  OS 116

FIG. 9G  WAV2

ENHANCING CONCEALMENT IN THE PRESENCE OF FINE MISTUNING FOR VARIOUS TV SCRAMBLING TECHNIQUES

REFERENCE TO PROVISIONAL APPLICATIONS

This application claims priority to U.S. provisional applications Ser. No. 60/093,694 filed Jul. 22,1998 and Ser. No. 60/108,182 filed Nov. 11, 1998.

CROSS REFERENCE TO RELATED APPLICATIONS

This invention is related to International Application PCT/US98/05163 filed on Mar. 17, 1998, U.S. patent application Ser. No. 09/212,236 filed on Dec. 17, 1997, by Quan; and U.S. Provisional Application filed Feb. 26, 1998, now U.S. patent application Ser. No. 09/233,99,236 filed on Jan. 20, 1999, by Quan. It is also related to U.S. Pat. No. 5,438,620 by Ryan et al issued on Aug. 1, 1995 All the above are incorporated by reference.

FIELD OF INVENTION

This invention relates to video scrambling signals that are transmitted or sent over cable and, in particular to a method and apparatus for overcoming the defeat of video signal scrambling processes caused by fine mistuning of a tuner circuit in a television set.

BACKGROUND OF INVENTION

With the fine tuning feature present in many television sets and VCRs, many current television scrambling systems are vulnerable to this feature. By fine tuning (mistuning) in just the correct way, a viewable picture is possible from a scrambled video signal. Such scrambled video signals, for example, may come from sync suppression scrambling systems and/or from video signals where the horizontal sync pulses are position and/or edge modulated.

The fine tuning feature of a television timer shifts the tuner's local oscillator to shift the video spectrum within the tuner's intermediate frequency (IF) bandpass filter. See for example, FIGS. 1A, 2A and 3A–3E. If the fine tuning is set to be slightly off center (mistuned), the mixed down video in the IF bandpass (FIGS. 3C, 3E) will not be optimal and will exhibit some middle to high frequency emphasis at the tuner's demodulator output (FIG. 4). As a result, the video signal will have leading and/or trailing edge emphasis or spikes in the time domain. The television's (TV) sync separator will sense the over emphasized negative or trailing edges as "sync" signals. Generally, the end of line picture information has some of the greatest negative edge information and becomes a sync signal when fine mistuned. As a result, a viewable picture is achieved on the TV set even though the video signal used sync suppression scrambling. Under correctly tuned conditions, the TV set would show a concealed and unviewable picture. The use of frequency equalizing the scrambled video, for example via fine mistuning, not only works to defeat the scrambling feature of sync suppression systems, but also to defeat those scrambling systems with position or edge modulated horizontal syncs.

SUMMARY OF THE INVENTION

Therefore there is a need for a countermeasure to video frequency equalization via use for example of the television's fine tuning control, such that various existing signal scrambling systems continue to provide concealed or unviewable signals.

The present method for maintaining concealment provided by sync suppression and sync modulation systems, under fine mistuned circumstances in a TV set, is to deemphasize the video frequency response in the scrambled signal prior to the modulator. At the descrambler end, a pre-emphasis in video frequency response is done to obtain an overall flat frequency response from transmitter to descrambled video output.

Yet another method that identifies that the end of line program content is the source for a viewable picture during fine tuning (mistuning), changes the fall time of the negative edge of video near the end of the television line.

Where sync modulation exists, there are other methods available to maintain concealment when the television set is fine mistuned to defeat this type of scrambling. One method that is prior art, is to have the trailing edge of video follow the sync modulation.

In this invention, there are several other ways to improve on the concealment. One way is to make the last 2 microseconds of the active video line close to a peak white level and then modulate the falling edge of this peak white level to follow the sync modulation. This peak white level guarantees that the trailing edge of the end of video line will be picked up by the fine tuning. A huge position modulated negative spike caused by fine tuning (mistuning) will be picked up as a sync signal and will maintain concealment via the position modulation.

Yet another way to maintain concealment of a sync modulated scrambling mode when fine mistuning is used to offset it, is to use a combination of peak white level and a waveform that follows the sync modulation during the last 2 microseconds of the end of the active video line. Upon addition of a waveform typically at about 500 Khz to 2 Mz, the waveform becomes enhanced during the fine tuning and thus appears as sync signals to the TV set. Since this waveform is also position modulated, it will cause the TV set to deliver a concealed picture. In short, under normal or correct fine tuning, the sync modulation causes the concealment of the video signal on a TV set. When the fine tuning is incorrect, the combination of the peak white level and/or waveform that is position modulated then causes the TV set to still deliver a concealed picture.

Still a further alternative embodiment includes various forms of vertical sync suppression and insertion, particularly in a sporadic manner. Thus, reinsertion of vertical sync pulses, although not necessarily standard vertical sync signals, along with the horizontal concealment techniques of previous mention provides enhanced signal concealment, particularly when using non-standard and/or sporadic vertical sync pulses in the VBI period. To this end, one technique of the invention removes some or all original vertical broad sync pulses and inserts a VBI with new vertical sync pulses of non-standard vertical sync locations, line fill signals and/or blanking or other signal voltages, in a sporadic or periodic manner.

BRIEF DESCRIPTION OF THE DRAWINGS

FIG. 2A illustrates the typical output video waveform when the fine tuning is set for normal or optimal. FIG. 2A is a result of the frequency response shown in FIG. 1A.

FIG. 2B illustrates the overshoot response of a video signal due to the incorrect fine tuning that cancels the effects of video scrambling. FIG. 2B is a result of the frequency response shown in FIG. 1B.

FIG. 2C illustrates a typical waveform for a sync modulated scrambled signal with fine tuning set correctly.

FIG. 2D illustrates a typical waveform for a sync modulated scrambled signal with the fine tuning (mistuning) set to cancel the scrambling effect by causing excessive overshoot response.

FIG. 2E illustrates a typical waveform for a sync suppression scrambling signal at the TV tuner's baseband video output when the fine tuning is set to normal.

FIG. 2F shows the sync suppression scrambling signal with excessive overshoots caused by incorrectly fine tuning the TV tuner to cancel the scrambling effects.

FIG. 6A illustrates another de-emphasis filter circuit of the invention.

FIG. 6B illustrates another pre-emphasis filter circuit.

FIG. 6C illustrates the frequency responses of circuits shown in FIG. 6A and FIG. 6B.

FIG. 6D illustrates the video waveform result when using a circuit such as illustrated in FIG. 6A for a modulated sync (6A(a)) and a sync suppression (6A(b)) scrambling process, respectively.

FIG. 6E illustrates the video waveform resulting from incorrectly fine tuning the TV for a modulated sync (6E(a)) and a sync suppression (6E(b)) scrambling process, respectively. FIG. 6E can also be the resulting waveform if a pre-emphasis network is used in the decoder when the TV set is correctly fine tuned.

FIGS. 9A–9G are waveforms illustrating the signals generated at various points along the circuit of FIG. 9.

FIG. 10 illustrates a horizontal concealment signal in accordance with the invention with a modulated edge fill pulse (MEFP) and/or modulated erroneous clamp pulse (MECP) signal. This modulation may be amplitude, pulse width and/or frequency, and the like.

DESCRIPTION OF THE PREFERRED EMBODIMENTS

Figure 1A:
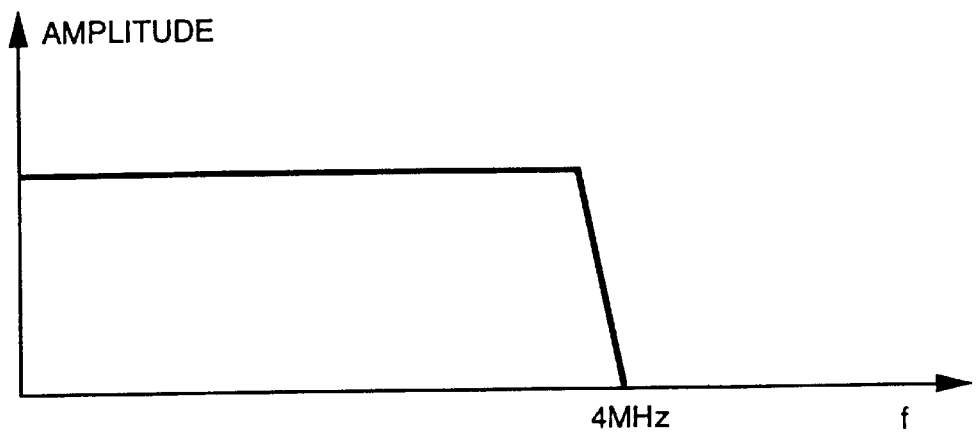
FIG. 1A illustrates a typical baseband frequency response from a TV tuner with the fine tuning control set at the normal position.
Figure 1B:
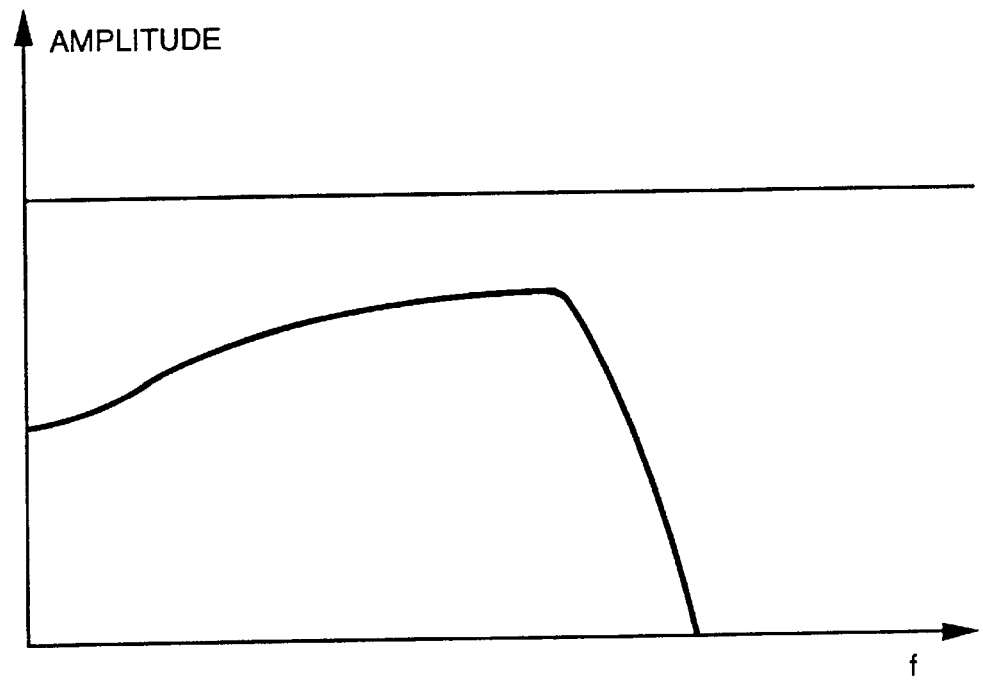
FIG. 1B illustrates a baseband frequency response from the TV tuner with the fine tuning control set at a mistuned position to cancel the effects of scrambling.
Figure 3A:
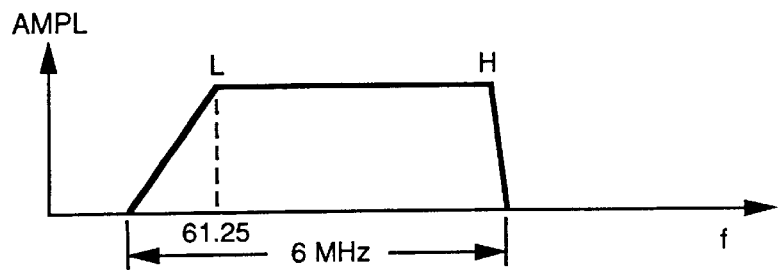
FIG. 3A illustrates the Radio Frequency (RF) spectrum of a TV channel.
Figure 3B:
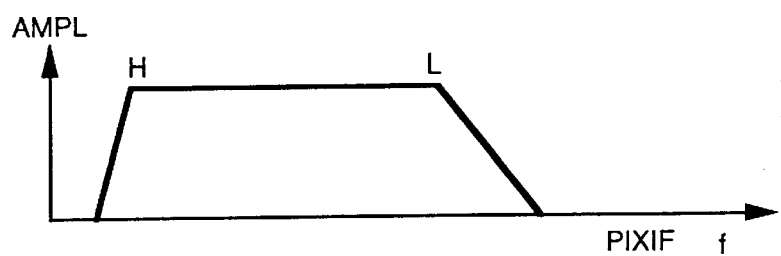
FIG. 3B illustrates the spectrum of the Intermediate Frequency (IF) portion of the tuner due to the RF input of FIG. 3A.
Figure 3C:
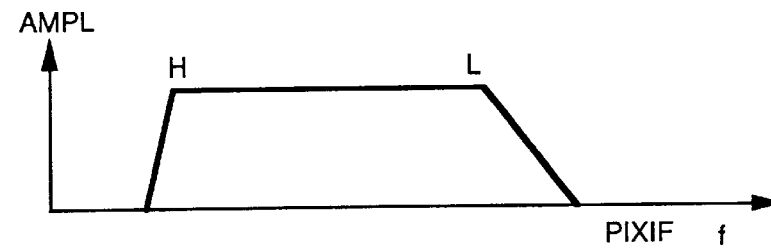
FIG. 3C illustrates a shift in the IF spectrum of FIG. 3B due to incorrect fine tuning to cancel the video scrambling effects.
Figure 3D:
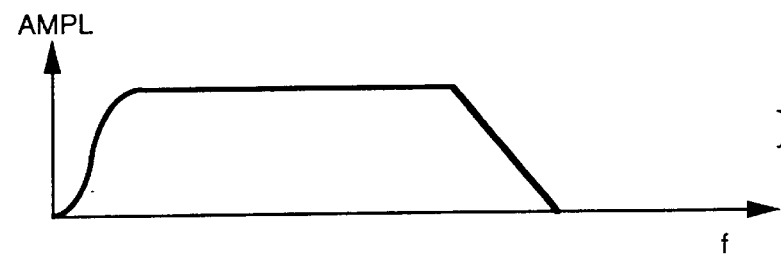
FIG. 3D illustrates the IF bandpass filter frequency response.
Figure 3E:
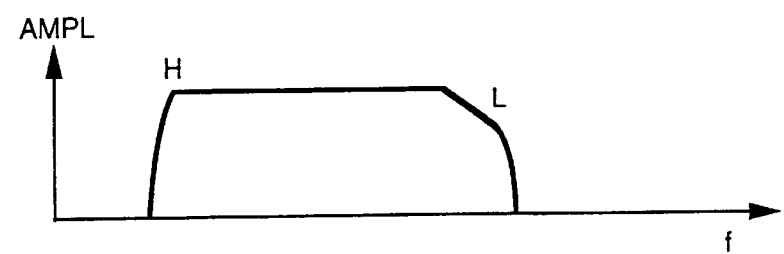
FIG. 3E illustrates the IF frequency response of an incorrectly fine tuned TV signal.
Figure 4:
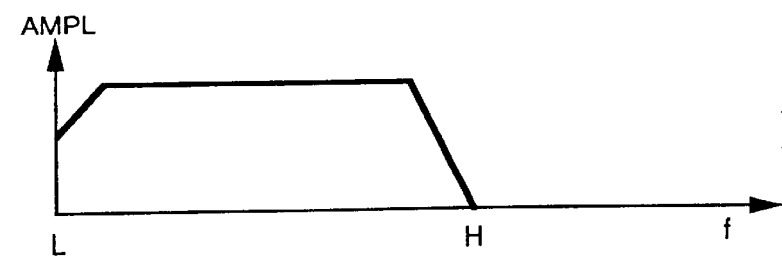
FIG. 4 illustrates a resultant demodulated video frequency response from FIG. 3E. Note the boosted middle and high frequencies.
Figure 5A:
FIG. 5A illustrates a block diagram of an embodiment of this invention using de-emphasis circuitry and illustrating pre-emphasis caused by fine mistuning.
Figure 5B:
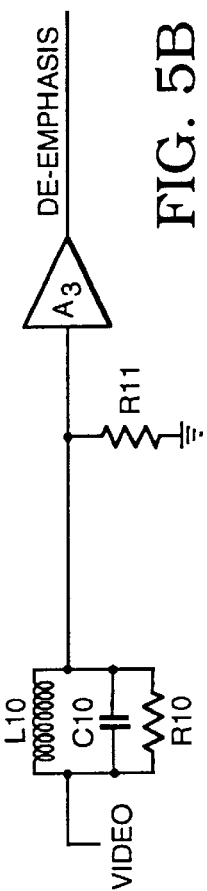
FIG. 5B illustrates a band reject filter commensurate with a de-emphasis network of the invention.
Figure 5C:
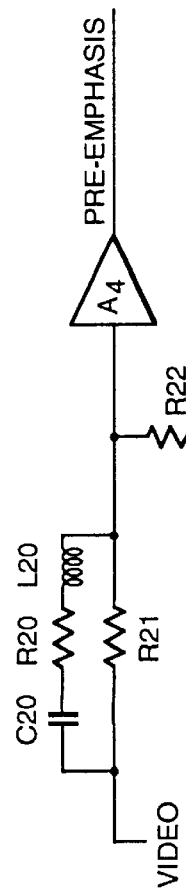
FIG. 5C illustrates a band pass filter capable of generating pre-emphasis such as caused by fine mistuning.
Figure 5D:
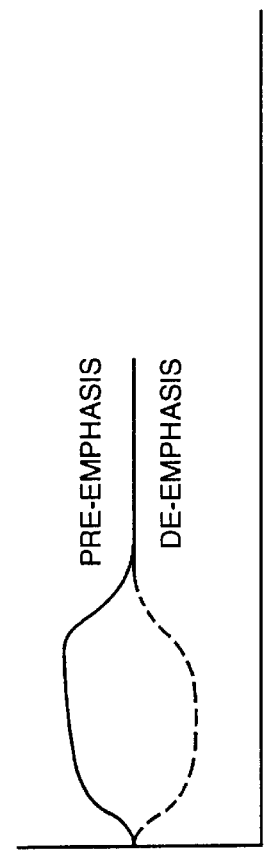
FIG. 5D illustrates the relative frequency responses of both de-emphasis and preemphasis filters.
Figures 7A, 7B:
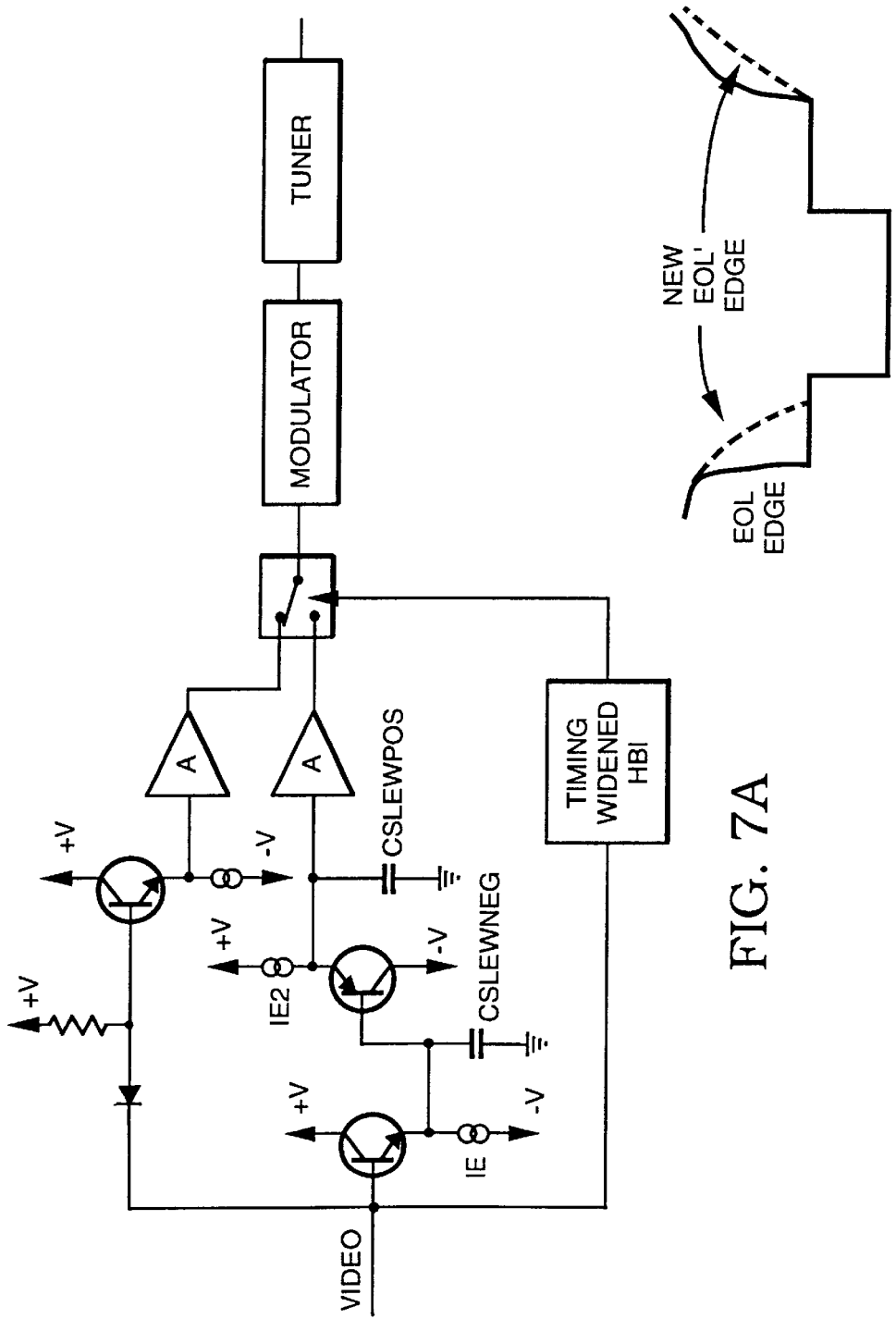
FIG. 7A illustrates a block diagram of the invention for lengthening the fall time and/or rise time of the end of video by using an amplifier that has very slow negative or positive slew rate, which should cancel the overshoot response of an incorrectly fine tuned TV during the falling edge of the video.
FIG. 7B is a waveform illustrating the effect of the circuit in FIG. 7A.
Figure 8A:
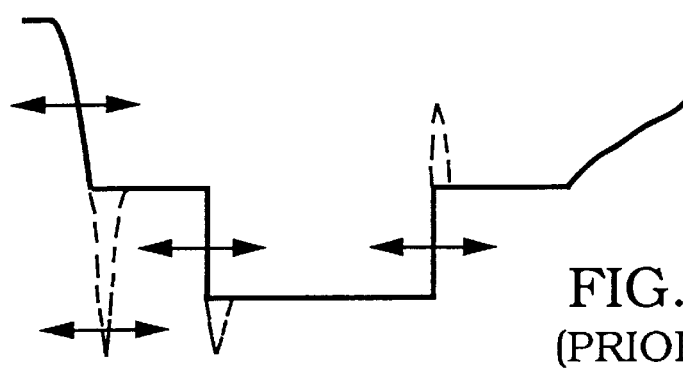
FIG. 8A illustrates a prior art waveform with sync modulation that is somewhat resistant to incorrect fine tuning.

A main intent of this invention to overcome the neutralizing effects that a pre-emphasis circuit, such as a fine mistuned filter depicted for example in FIGS 5C and 6B, has on a scrambled signal. See for example FIGS. 1B, 2B, 2D, 2F, 3C, 3E and 4 for responses and waveforms generated by fine mistuning processes. The scrambled signal such as illustrated in FIGS. 2C, 2E and 8A, may be the result of horizontal sync modulation and/or sync suppression scrambling processes. In some sync suppression systems, controlled rise and/or fall times in the HBI, for example, can offset the neutralizing effects of the television's tuner being fine mistuned. The controlled rise and/or fall times may be realized by a slew rate amplifier such as in FIG. 7A, which generates the waveform described in FIG. 7B. In FIG. 7A the fall and rise times are controlled via a signal IE with CSLEWNEG and a signal IE2 with CSLEWPOS respectively. Controlled rise and/or fall times may also be realized by using de-emphasis circuits such as in FIG. 5B and FIG. 6A. The resulting transient responses are shown in FIGS. 5D and 6C.

FIG. 6E shows a resultant waveform after fine tuning (mistuning) has been applied to cause a pre-emphasis effect. As seen in FIG. 6E, the video signal has little overshoot or preshoot and signals S1A and S2A are the resulting normal modulated sync and suppressed sync scrambling signals. In the case of fine tuning (mistuning) to the extreme to "decode" a scrambled signal with horizontal overlays for instance, the preemphasis curve can exceed +6 dB per octave.

Figure 8B:
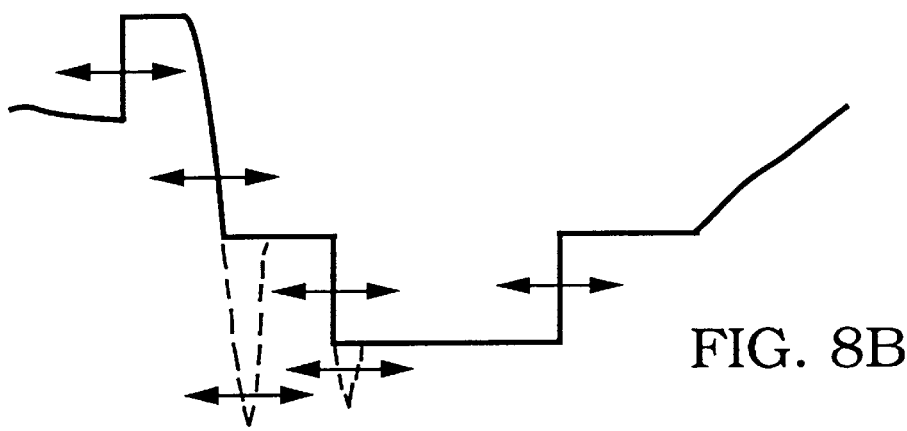
FIG. 8B illustrates an improved sync modulation scrambling waveform generated by inserting a peak white signal near the end of the TV line in accordance with the invention.
Figure 8C:
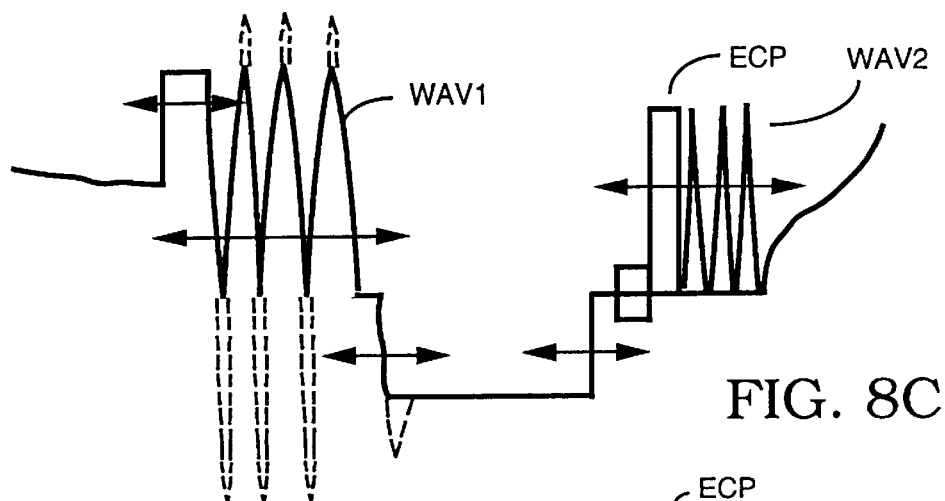
FIG. 8C illustrates an improvement over the results shown in FIG. 8A and FIG. 8B, generated in accordance with the invention by adding a new position modulated waveform WAV1 as shown with a peak white signal. Optional signals ECP and WAV2 are also shown.

In some cases, a normal video signal with flat frequency response to about 4 Mhz will show a +12 dB per octave slope of pre-emphasis. As a result the video waveform will have both overshoots and preshoots similar to video aperture correction circuits. As a result substantial de-emphasis may be required. However substantial de-emphasis can mean a loss of overall signal to noise ratio at the decoder output. Therefore, to preserve signal to noise ratio, by not necessarily using de-emphasis, it is possible to add extra signals to preserve the scrambling effect even when using "extreme" fine tuning. These extra signals do not cause extra concealment in a normally tuned set, but cause a mistuned set to "scramble" or maintain at least some concealment. Extra signals such as waveforms WAV1 and WAV2 are illustrated in FIG. 8C. It is an object for extra signals WAV1 and/or WAV2 to follow, in general, the position modulation of the horizontal sync. When fine mistuning is used to cause pre-emphasis, the position modulated extra signal such as WAV1 will be over emphasized as depicted in dashed line and cause the television set's horizontal oscillator to follow the WAV1's position modulation. Note that the number of cycles in WAV1 and/or WAV2 can be anywhere from one half to many. As a result, a concealed picture will be displayed.

It has also been found that extreme pre-emphasis caused by mistuning of the tine tuning, or other means (circuitry) that causes preshoots of the video signal, can have a neutralizing effect on the scrambled signal. As previously mentioned, a peak white signal near the end of the active line with a track and hold edge fill is beneficial. However it is sometimes better to track and hold the last few or so pixels (luma pixels for example) instead of tracking and holding a peak white level signal. The reason is that the peak white level signal has a stable leading edge that acts like a stable horizontal sync signal when pre-emphasized with preshoots. It may then be necessary to modulate the leading edge of the peak white level signal to insure concealment with fine mistuned television sets (see FIG. 8B).

Figure 9:
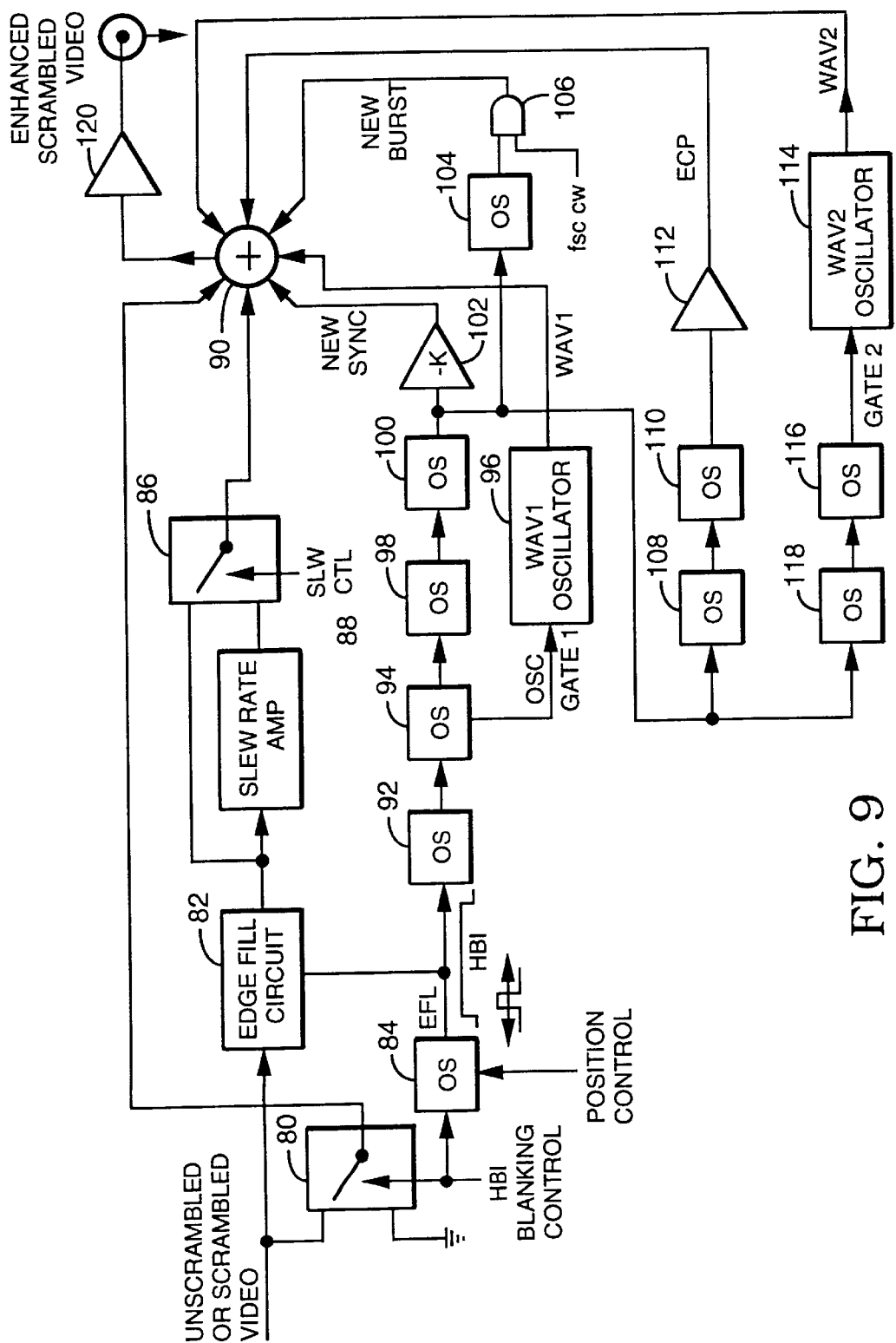
FIG. 9 illustrates a circuit of the present invention that generates the waveform WAV1 as seen in FIGS. 8C and 8D, along with edge fill and controlled fall and/or rise times in the HBI (horizontal blanking interval) via a slew limit amplifier, and also illustrates circuits that generate the optional waveforms ECP and WAV2.

To maintain concealment in a frequency pre-emphasized environment, a combination of de-emphasis and an apparatus as shown in FIG. 9 may be used. FIG. 9 illustrates an edge fill circuit for the last active pixels, a slew limit amplifier for generating controlled rise and fall times, a position modulated waveform circuit (WAV1), a position modulated sync circuit (NEW SYNC), an erroneous clamp pulse (ECP) (position modulated) circuit, and another position modulated waveform circuit (WAV2). It should be noted that the WAV1, WAV2, ECP, and NEW SYNC signals can also be amplitude, frequency, position and/or pulse width modulated.

Referring to FIG. 9, the video input which may be scrambled or unscrambled, is fed to a horizontal blanking interval (hereinafter HBI) blanking switch 80 responsive to an HBI blanking control. The video input is also fed to a sample, or track and hold, circuit known as "edge fill" circuit 82. The output of blanking switch 80 has about 12 to 16 microseconds blanked in the HBI period. The leading edge of HBI blanking control is fed to a variable one shot timing circuit 84 which provides an output of EFL, a position modulated signal that has for example about an 8 microsecond positional shift within the HBI vicinity. The EFL signal is used to control edge fill circuit 82 so the last luma pixels of the television line are filled into the HBI as the EFL signal is position modulated. The output of edge fill circuit 82 is coupled to one input of a switch 86 and to a slew rate limit amplifier 88, whose output in turn is coupled to the other input of the switch 86. Switch 86 is controlled by a signal SLW CONT which inserts slower rise and fall times into the HBI vicinity. The slew rate circuitry may be used to control the rise and fall times within the HBI where the edge fill signal is not used. The output of switch 86, which is fed to an input of a summing circuit 90, then is a track and hold signal corresponding to the last pixels, and/or to slow rise and/or fall times of the video signal during the HBI vicinity. The EFL signal also supplies a one shot timing circuit 92, which is set normally for a short duration (i.e. less than 1 microsecond) to set up an optional gap between the edge fill signal and the beginning of WAV1. The output of circuit 92 (FIG. 9A) is supplied to another one shot timing circuit 94, which sets the start and stop points on a WAV1 oscillator circuit 96 via a gate signal. The output of circuit 96 (FIG.9B) is then a position modulated wave front signal WAVE corresponding to signal EFL and is coupled to an input of the summing circuit 90.

To generate a position modulated NEW SYNC signal after the WAV1 signal, one shot circuits 98 and 100 are used. Circuit 98 sets up an optional gap between the end of WAV1 signal and the beginning of NEW SYNC signal. The circuit 100 sets the width (i.e. about 2 microseconds) of NEW SYNC signal. The output of circuit 100 is supplied to an inverting amplifier 102, whose output (FIG. 9C) is supplied to another input of the summing circuit 90. It should be noted that amplifier 102 may contain a low pass filter to roll off the transient rise and/or fall times of NEW SYNC. Thus the output of amplifier 102 may instead have a rolled off (transient or frequency) response of the NEW SYNC signal (for example, see the sync signal of FIG. 6D.

A regenerated burst signal is also position modulated and is derived by triggering off the trailing edge of the NEW SYNC signal via a one shot circuit 104 which sets the burst envelope width. An AND gate 106 gates through a color subcarrier frequency signal supplied thereto, to supply a new color burst signal (FIG. 9D) into summing circuit 90.

Figure 8D:
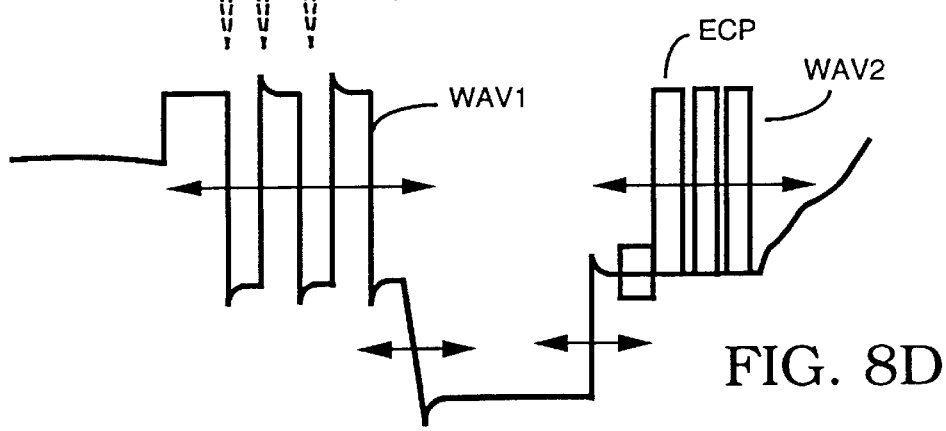
FIG. 8D illustrates a variation of FIG. 8C generated by sharpening and/or pre-emphasizing the edges of the modulated peak white signal and WAV1 and the edges of the modulated sync, so that an incorrectly tuned TV uses these as sync signals, thereby preserving concealment. Optional signals ECP and WAV2 are also shown.

Optional waveforms such as an erroneous clamp pulse and/or another wave packet similar to WAV1 (FIGS. 8C, 8D) can also be added after the NEW SYNC signal. These optional waveforms will also be emphasized by the fine mistuning of previous mention, or equivalent effects. Since these optional waveforms are also position modulated, the television set may then display a more concealed picture. Thus, the output of the one shot circuit 100 is coupled to a one shot circuit 108 which sets up an optional gap between the trailing edge of NEW SYNC and the leading edge of an erroneous clamp pulse (ECP) signal. The width of ECP signal is set by a one shot timing circuit 110. Ideally if a WAV2 signal (see below) is not used, the ECP signal stretches from the trailing edge of NEW SYNC to the end of the HBI. Under these conditions, ECP signal can have a pulse width as large as 8 microseconds or more (after NEW SYNC) which can be very useful in creating a darkened display. The output of timing circuit 110 is fed to an amplifier 112 whose output (FIG. 9E) is coupled to another input of the summing circuit 90.

The WAV2 signal is another wave form similar to WAV1 which follows the NEW SYNC or ECP signal. It is generated by a gated oscillator 114. The gate width is determined by a one shot timing circuit 116 (FIG. 9F). The optional gap between the start of WAV2 and NEW SYNC is determined by a one shot timing circuit 118. The output (FIG. 9G) of the WAV2 oscillator 114 is then coupled to still another input of the summing circuit 90.

The output of summing circuit 90 is coupled to an output amplifier 120. An example of the output signal supplied via the amplifier 120 is illustrated in FIG. 8C.

It should be known that modifying, shifting or varying the carrier of the modulator as illustrated in FIG. 5A for example, is another technique of the invention for maintaining concealment of the scrambled signal when fine mistuning is attempted. The reason is that the person using the fine tuning control will have to continuously remistune mistune the fine tuning of the television set. However, the modulator's carrier frequency is varied in a random fashion. Thus it is very difficult to re-mistune the fine tuning in the random fashion as means to cancel the concealment effect of the scrambled signals. The random frequency variation of the modulator carrier frequency can be of the order of plus to minus 300 kHz, for example. Of course, the rate of frequency change should be kept low (i.e. a 600 kHz shift over the period of 2 seconds), for example to allow the TV set to be viewed with minimum artifacts.

As previously mentioned, in some cases television receivers with fine tuning allow improved viewing of scrambled signals. However, it was found that a combination of horizontal overlay signals such as those illustrated in FIG. 10, and modified vertical sync insertion and/or deletion, re-established concealment in accordance with the invention. The use of modified, random or non-random vertical sync signals in the VBI vicinity can also be used to enhance scrambling in general.

Figure 10:
Figure 10:
Figure 10:
Figure 10:
Figure 10:
Figure 10:
Figure 10:
Figure 10:
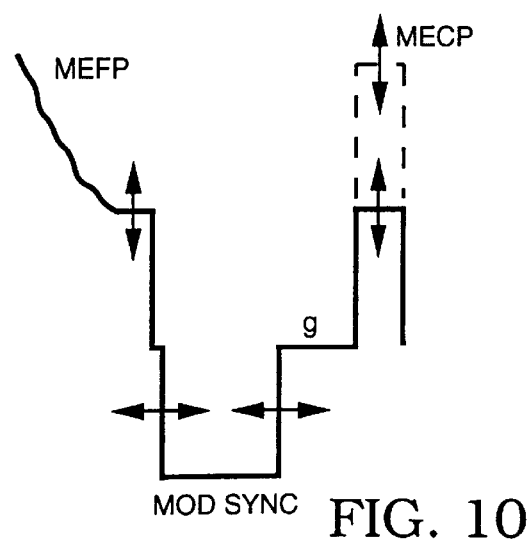

To this end, FIG. 10, illustrates an example of a scrambled signal that causes improved horizontal concealment. It consists of a single or double edge modulated sync, MODSYNC, a modulated edge fill signal, MEFP, and a modulated erroneous clamp pulse signal, MECP (for darkening and or horizontal concealment). For a typical application, MEFP can be amplitude modulated. MECP can also be amplitude modulated. The modulation frequencies (and/or phase) can be the same or different for MEFP and MECP. It was found that MEFP and MECP were amplitude modulated in the frequency range of 10 Hz to 20 Hz, for example, there was very intense flickering that discouraged viewing. Thus, an object of the invention is to cause viewer discouragement, in this instance by flickering the scrambled signal to conceal the program video.

At the same time if MDSYNC is position (or pulse width) modulated for example at about 601 Hz in a 60 Hz field frequency system, good horizontal concealment is provided in a normally tuned set.

However, with some other television receivers, whether mistuned or not, it was found that a signal such as in FIG. 10, if accompanied with vertical sync suppression (i.e. substantial reduction in vertical broad sync pulses) causes some reduction in concealment. It also was found that reinsertion of vertical sync pulses, although not necessarily standard vertical sync, provides improved horizontal concealment. For both horizontal and vertical concealment it is preferable that a signal such as that illustrated in FIG. 10 be combined with non-standard and/or sporadic vertical sync pulses in the VBI period. The reason for using non-standard vertical sync pulses, is that use of a consistent or standard vertical sync signal allows the television receiver and/or illegal cable decoder to reduce concealment.

Figures 11, 12, 13:
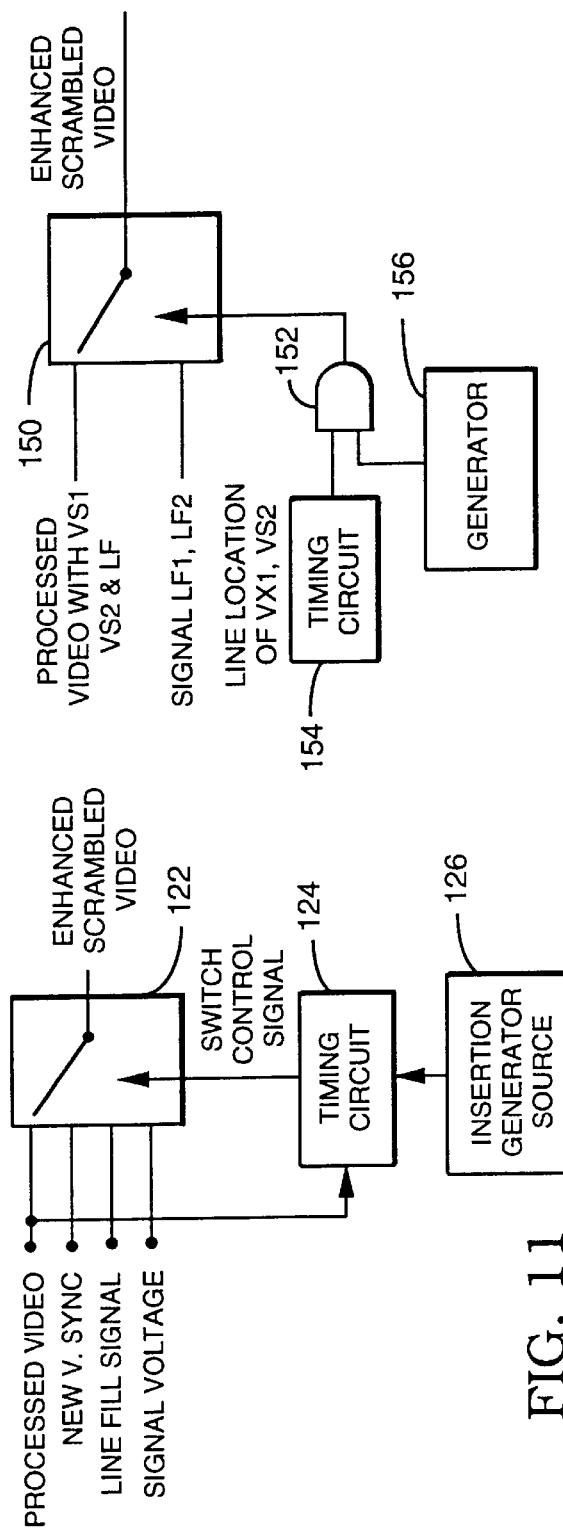
FIG. 11 illustrates a block diagram of the invention for providing a sporadic vertical sync modification.
FIG. 12 illustrates another block diagram of the invention in which new sporadic vertical syncs arc multiplexed with line fill signals.
FIG. 13 illustrates another block diagram of the invention for inserting the nonstandard vertical sync signal of, for example, FIG. 10, while alternately inserting line fill signals.

One way to create non-standard vertical sync is illustrated in FIG. 11, wherein processed video such as program video with the modifications of FIG. 10 is input to a selector switch 122. The output of switch 122 contains the horizontal concealment signals of FIG. 10 during much of the active television field plus a vertical blanking interval (VBI) modification. This VBI modification, for example, removes all of the original vertical broad sync pulses, and inserts, in a sporadic or periodic manner, a VBI with new vertical sync pulses of non-standard vertical sync locations, line fill signals, and/or blanking level signals, or other signal voltages. This modification can switch via the switch 122 between new vertical sync pulses of varying locations and a line fill signal (i.e. a varying signal from about blanking to about white level). From time to time, the VBI may contain a third signal such as a blanking signal or a voltage signal. FIG. 11 then illustrates a manner in which the video signal is modified by the switch 122 which in turn is controlled by a timing circuit 124 driven by an insertion generator source 126. The output of switch 122 thereby causes a television receiver tuned normally or not normally to have at least vertical instability and/or horizontal concealment.

FIG. 12 illustrates yet another example of generating a television scrambling signal resistant to the fine mistuning process (but can be used with correctly tuned TV sets as well). Under normally tuned sets, an output 128 provides both vertical and horizontal concealment. Here again the vertical sync pulses are made non-standard so that vertical instability occurs when fine mistuning is attempted by an unauthorized viewer. Processed or scrambled video containing the modifications shown for example in FIG. 10, along with video line position modulation, are supplied to FIG. 12 via an input 130. Any vertical sync pulses are reduced and/or eliminated by a vertical sync blanking circuit 132, which provides to a summing circuit 134 a version of the signal on input 130 but without vertical sync pulses. A timing circuit 136 coupled to input 130 adds nonstandard sync in various locations near or in the VBI and supplies the signal to the summing circuit 134. The output of circuit 134 is supplied to a switch 138 via a resistor. A second timing circuit 140 coupled to input 130 controls the switch 138 in a sporadic or periodic manner so as to blank out the new vertical sync pulses at preferably random times.

That is, some times vertical sync pulses of one location pass through the switch 138 while at other times vertical sync pulses of another location are blanked. At times, vertical sync pulse of all locations may be blanked by switch 138. Whenever any of the new vertical (non-standard) sync pulses are blanked, it is preferable but not necessary to add and/or insert a signal in the locations of blanked new vertical sync pulses. This is illustrated via a line fill generator 142 and a logic AND gate 144. The output of the AND gate 144 is a signal that is logic high corresponding to those lines that are blanked by switch 138, and which is supplied to a modulator 146 (i.e. amplitude, pulse width, frequency and the like). In one example, the output of modulator 146 is an amplitude modulated signal which varies from about blanking level to about white level. The selectively modulated signal is supplied to a summing circuit 148.

The output of modulator 146 is also referred to as a line fill signal which fills in the VBI and its vicinity with generally non-blanking level signals. Such a line fill signal becomes important in some cases for resistance to certain television receivers and/or illegal cable decoders. The line fill signal also may be varied from about sync level to about white level with the option of at least one serration in each line of the line fill signal.

In FIG. 12, the summing circuit 148 provides the output 128 which comprises a scrambled signal that contains video position modulation and various signals as shown in FIG. 10. The output 128 also includes, for example, the sporadic vertical sync pulses of various locations and line fill signals of previous mention. It should be noted that the vertical sync pulses at the output 128 may also have been modulated by amplitude, pulse width and the like, and/or may also contain serrations.

FIG. 13 is a simplified block diagram illustrating an insertion switch 150 receiving a scrambled video input with VBI line fill signals (LF) and non-standard vertical syncs (VS1 and VS2) along with signals such as those in FIG. 10. The other input of switch 150 is the modulated line fill signals, LF1 and LF2. The switch 150 is controlled with a logic AND gate 152, a timing circuit 154 and a generator 156 such that the output of the switch has properties similar to those described on output 128 in FIG. 12. Timing circuit 154 provides a logic high for the television line locations of VS1 and VS2. Generator circuit 156 is used to gate through any combination of VS1 and VS2. The switch 150 switches in any combination of LF1 and LF2 whenever any combination of VS1 and VS2 is not passed. The line locations of LF1 and VS1 are for example substantially the same, and the line locations of LF2 and VS2 also are for example substantially the same.

Figure 14A:
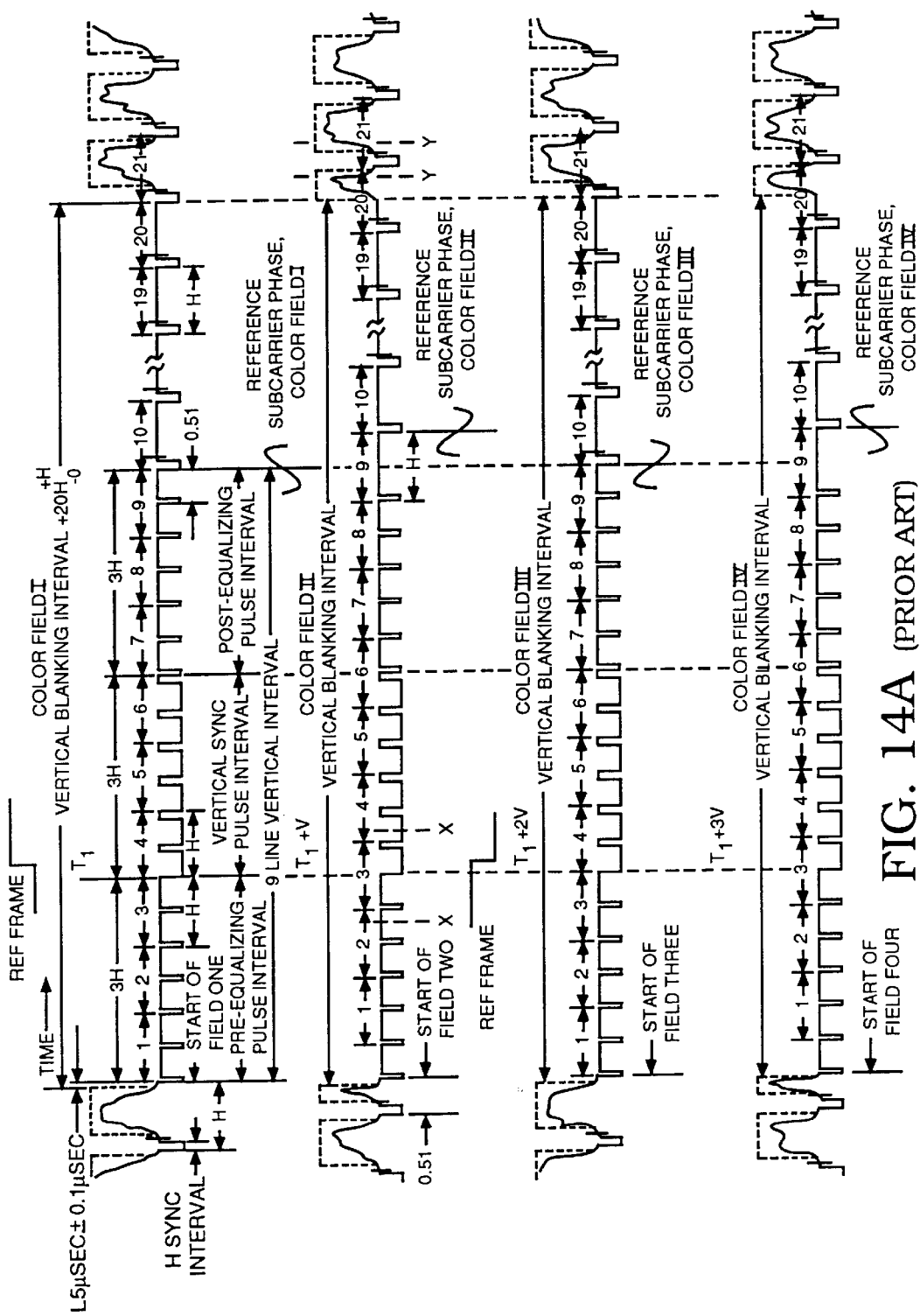
FIG. 14A is a waveform illustrating standard vertical syncs in a video signal.
Figure 14B:
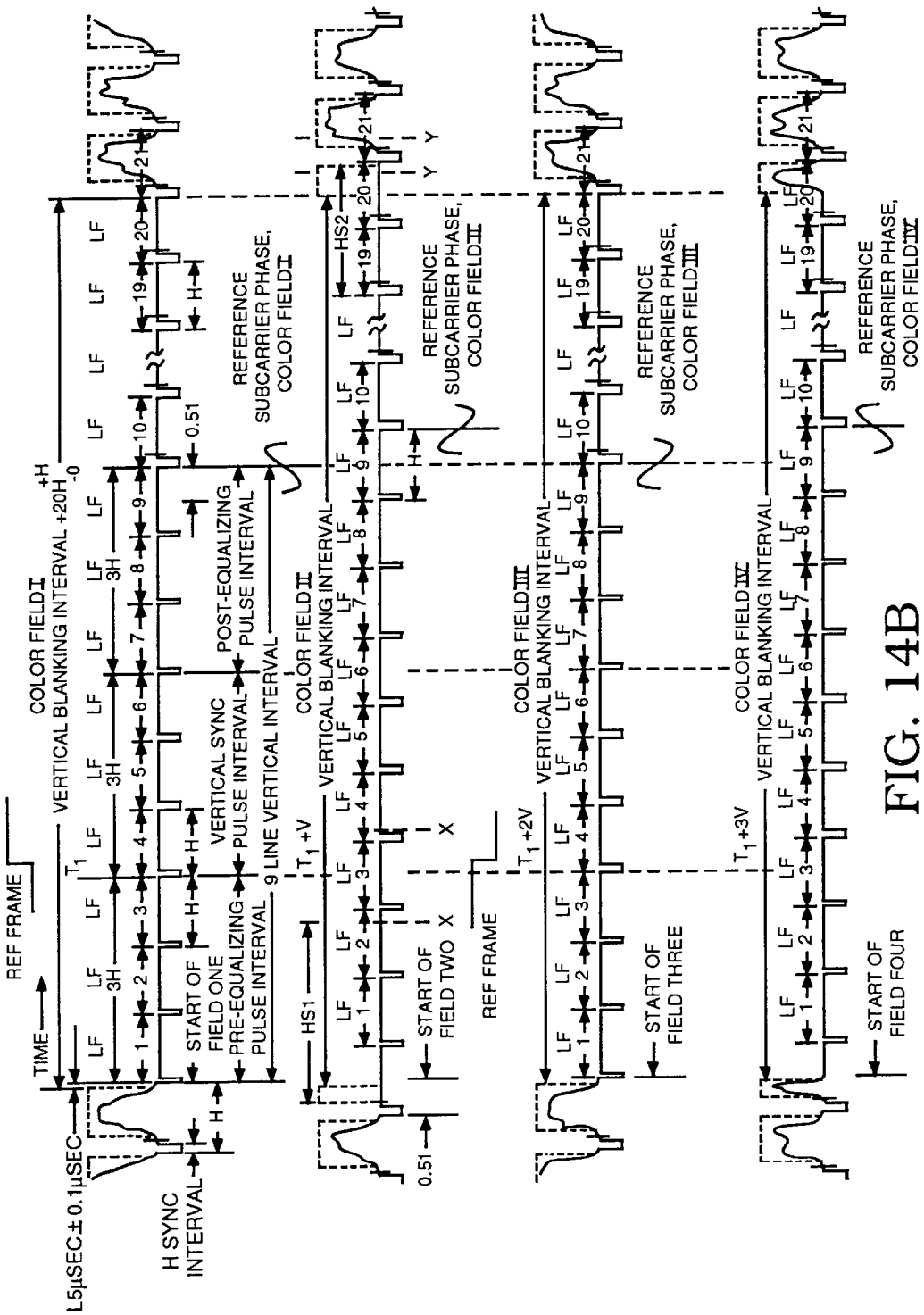
FIGS. 14B–14F are waveforms illustrating the various vertical sync signals and line fill modifications of the invention that may be used with the signal illustrated in FIG. 10 for an effective video concealment signal in the presence of fine mistuning.

FIGS. 14B to 14F show examples of the "sporadic" vertical sync pulses of previous discussion. FIG. 14A illustrates a video signal that has normal vertical sync signals. FIG. 14B illustrates a video signal with the vertical sync pulses removed.

Figure 14C:
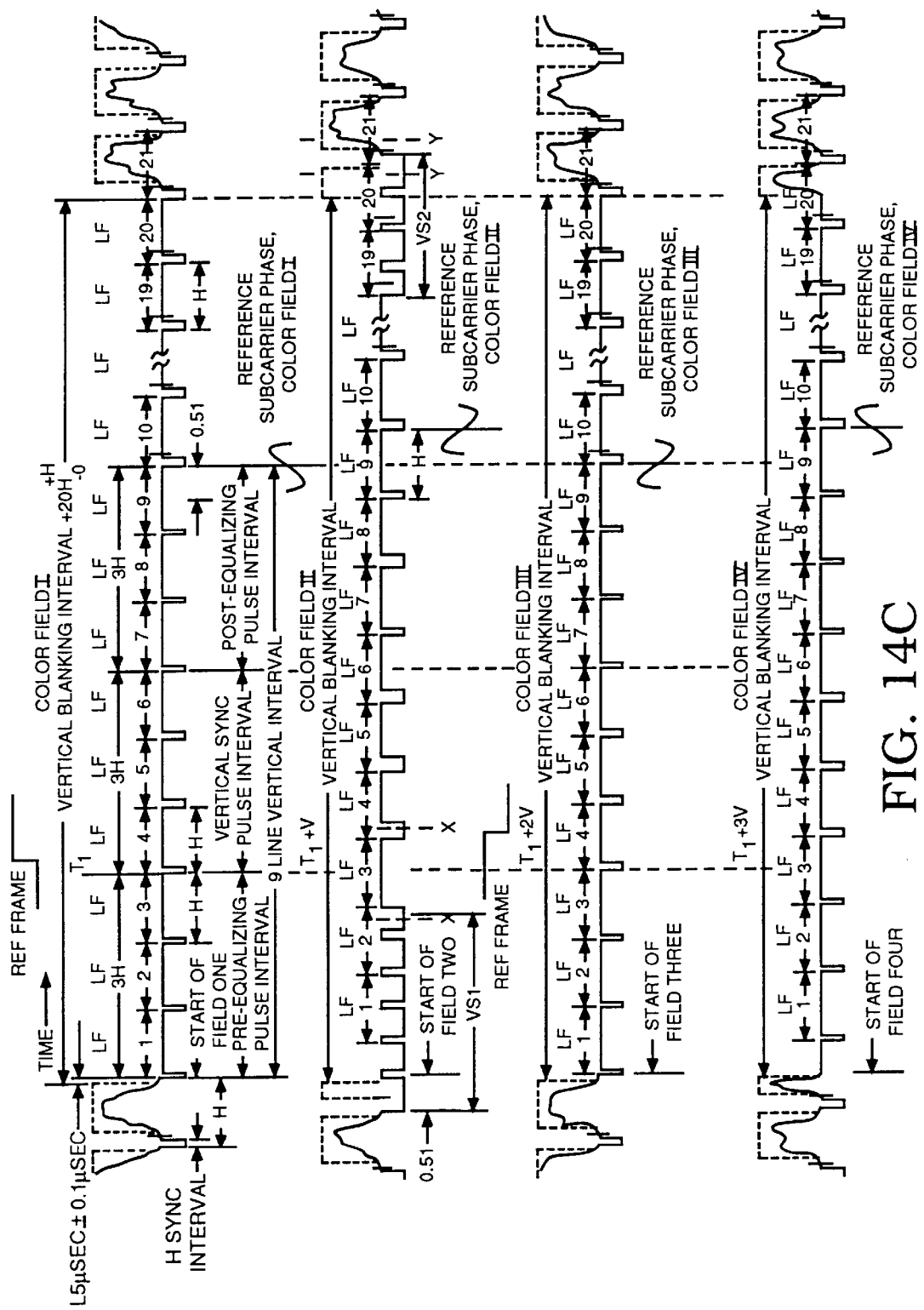

FIG. 14C illustrates line fill signals, LF, added or inserted to the non-standard vertical sync signals, VS1 and VS2. See FIG. 14C color field II. LF signals can also comprise data and/or test signals along with a modulated signal.

Figure 14D:
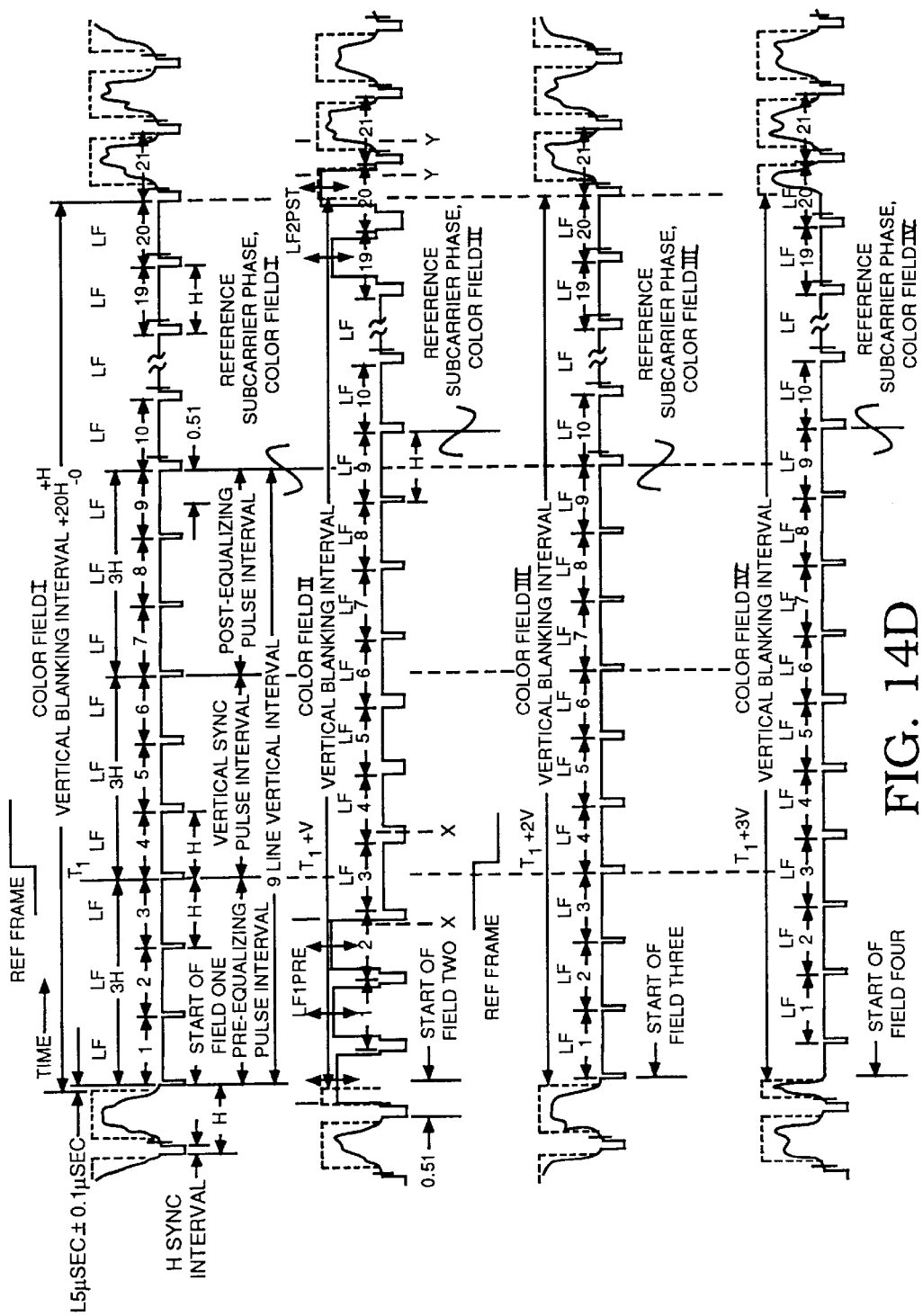
Figure 14E:
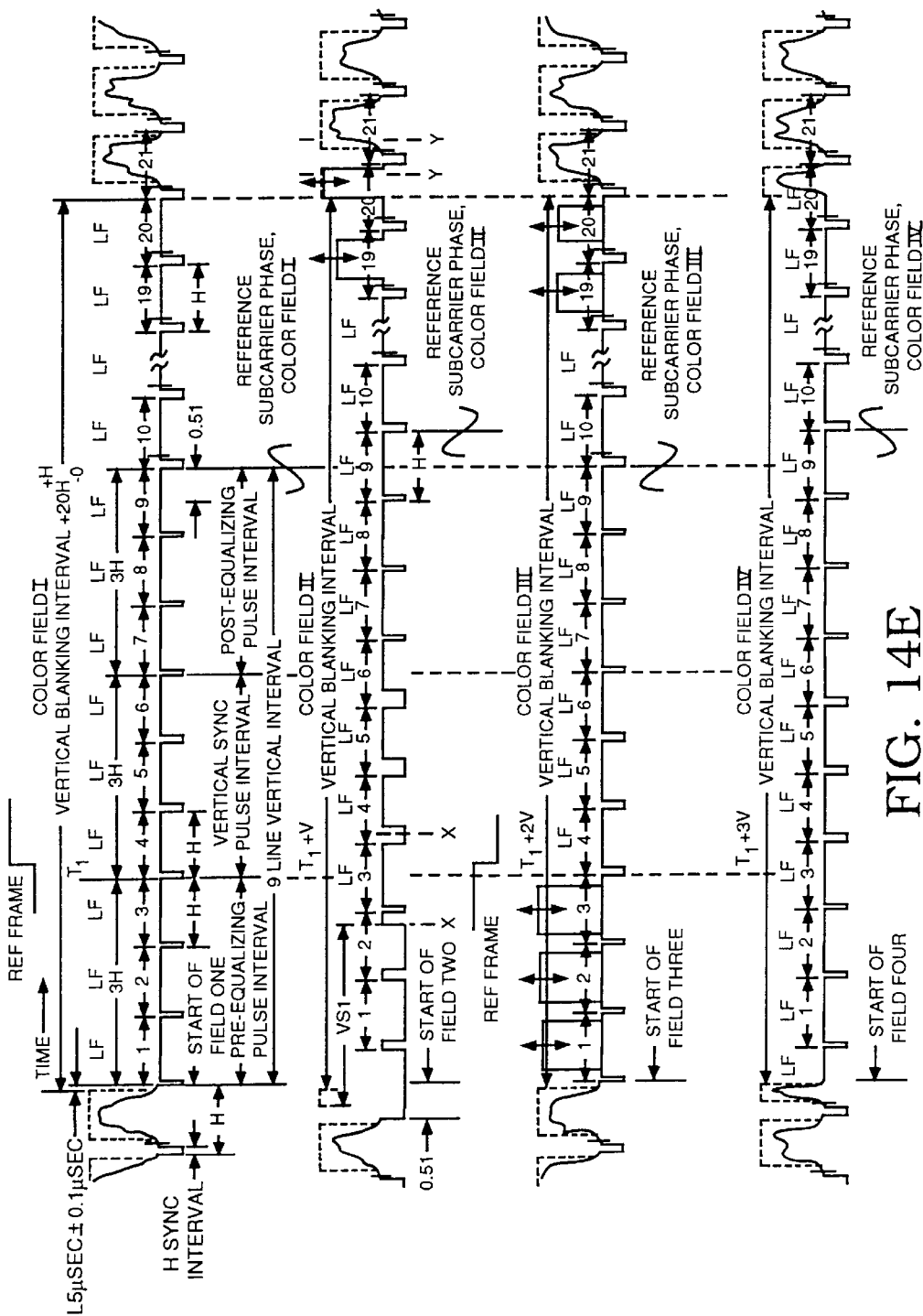
Figure 14F:
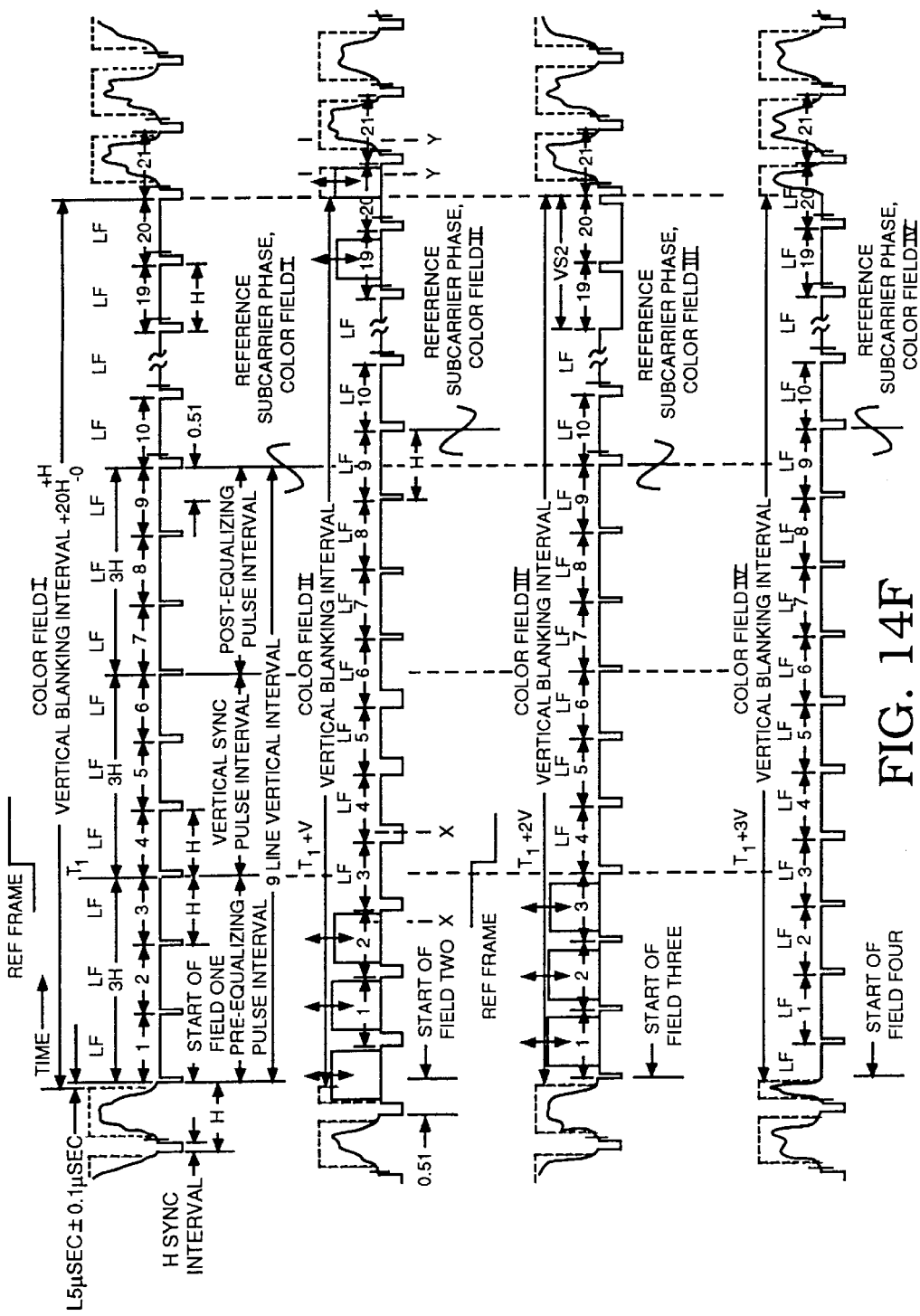

FIG. 14D illustrates a situation where non-standard VS1 and VS2 are replaced with line fill signals, LF1 (pre) and LF2 (post). FIG. 14E illustrates a situation where only VS1 reappears in color field II. FIG. 14F illustrates VS1 replaced with a line fill signal in color field II while VS2 reappears in color field III.

For this invention, any combination of the examples shown in FIGS. 14B through 14F over time periods, can generate the desired effect of overcoming the scrambling defeating effects of fine mistuning.

What is claimed is:

1. A method of maintaining concealment of a scrambled video signal when a tuner circuit of a television (TV) set is fine mistuned to thereby defeat the signal concealment provided by the scrambling effect, comprising:

applying a scramble enhancing signal to the scrambled video signal, which scramble enhancing signal includes characteristics for enhancing the presence of the scrambling effect with respect to a signal generated by said fine mistuning of the tuner circuit to force the tuner circuit to respond to the applied scramble enhancing signal rather than the signal generated by fine mistuning, to maintain the concealment of the scrambled video signal.

2. The method of claim 1 wherein fine mistuning of the tuner circuit generates pre-emphasis effects, and wherein the act of applying includes:

applying a de-emphasis process to the scrambled video signal to enhance the detection of the scrambling process by the tuner circuit of the TV set while overcoming the pre-emphasis effects of the fine mistuning.

3. The method of claim 2 wherein the fine mistuning causes over-emphasized sync signal leading and trailing edges, the method comprising:

applying the de-emphasis process to the scrambled video signal prior to the modulator in the TV set to de-emphasize the video frequency response and thus the pre-emphasis effects in the scrambled video signal.

4. The method of claim 2 wherein the fine mistuning causes an overshoot response during falling edges or rising edges of the scrambled video signal, comprising:

applying the de-emphasis process by lengthening the fall or rise time of the falling or rising edge, respectively, of the scrambled video signal.

5. The method of claim 4 wherein the lengthening of the fall time is provided via an amplifier means having a very slow negative slew rate.

6. The method of claim 1 wherein the scrambling effect includes sync modulation, wherein the act of applying includes:

applying a signal approaching video peak white level to the scrambled video signal; and modulating the falling and/or rising edge of the peak white level signal to cause the signal to follow the sync modulation;

wherein the fine mistuning generates a large overshoot at the modulated falling and/or rising edge which then is detected by the tuner circuit to maintain concealment.

7. The method of claim 1 wherein the scrambling effect includes sync modulation, wherein the act of applying includes:

applying a signal approaching a video peak white level to the scrambled video signal;

applying a waveform that follows the sync modulation during a few microseconds of time at the end and/or the beginning of an active video line; and wherein the resulting large modulated overshoots caused by the fine mistuning are detected by the tuner circuit to maintain the concealment.

8. The method of claim 7 wherein the waveform is a sinewave or a squarewave waveform.

9. The method of claim 1 wherein the scrambling effect includes single or double edge horizontal sync modulation, wherein the act of applying includes:

applying an amplitude modulated edge fill signal at the end of the video line, which signal also follows the horizontal sync modulation; and applying an amplitude modulated erroneous clamp pulse signal following the horizontal sync in a back porch interval of the video line.

10. The method of claim 1 wherein the scrambled video signal includes standard sync signal modulation in vertical blanking intervals, wherein the act of applying includes:

removing the vertical blanking interval standard sync signals;

inserting with sporadic or periodic timing amplitude modulated line fill signals and new vertical blanking intervals containing new vertical sync signals of non-standard vertical sync locations.

11. The method of claim 10 including:

providing new vertical sync signals of varying line locations, and line fill signals varying from about blanking level to about white level; and switching from the scrambled video signal to the new vertical sync signals and/or line fill signals during the new vertical blanking intervals.

12. The method of claim 11 further including:
providing another signal of a blanking level or selected voltage level; and
inserting the another signal in selected intervals of the new vertical blanking intervals.

13. The method of claim 1 wherein the scrambled video signals includes standard vertical sync pulses in vertical blanking intervals, wherein the act of applying includes:
removing the standard vertical sync pulses from the scrambled video signal;
inserting non-standard vertical sync pulses in or near the vertical blanking intervals; and
blanking the non-standard vertical sync pulses in a sporadic or periodic manner to remove them in correspondingly random fashion.

14. The method of claim 13 including:
generating a line fill signal;
selectively modulating the line fill signal; and
inserting the modulated line fill signal into at least some of the vertical blanking intervals containing the randomly blanked non-standard vertical sync pulses.

15. The method of claim 14 including:
amplitude and/or position modulating the line fill signal.

16. The method of claim 1 wherein the scrambled video signal includes non-standard vertical sync pulses and vertical blanking interval line fill signals, the method including:
providing modulated line fill signals;
providing the locations of video lines containing non-standard vertical sync signals; and
switching into the scrambled video signal a combination of the modulated line fill signals whenever a combination of the non-standard vertical sync signals is not passed.

17. Apparatus for maintaining concealment of a sync modulated and/or sync suppressed scrambled video signal when a tuner circuit of a television (TV) set is fine mistuned to thereby defeat the signal concealment provided by the scrambling effect, comprising:
circuit means for inserting a scramble enhancing signal into the scrambled video signal at selected times in the scrambled video signal;
output means responsive to the circuit means for outputting the enhanced scrambled video signal; and
wherein said tuner circuit, though being fine mistuned, is forced to respond to the inserted scramble enhancing signal rather than the fine mistuning to maintain the concealment of the scrambled video signal.

18. The apparatus of claim 17 wherein the fine mistuning causes frequency pre-emphasis to be applied to the scrambled video signal to defeat the scrambling effect, wherein the circuit means include:
a de-emphasis circuit receiving the scrambled video signal for applying a de-emphasis effect thereto to counteract the effects of the fine mistuning;
said output means outputting the de-emphasized scrambled video signal; and
modulator means receiving the de-emphasized scrambled video signal, and including the tuner circuit, for responding to the de-emphasized scrambled video signal to maintain the concealment.

19. The apparatus of claim 18 wherein the pre-emphasis causes an overshoot response during negative or positive edges at the end or beginning, respectively, of video lines, wherein the de-emphasis circuit includes:
amplifier means having controllable fall and rise times for receiving the scrambled video signal with the overshoot response; and
voltage sources coupled to the amplifier means for controlling the durations of the fall and rise times to increase accordingly the durations of the negative or positive edges affected by the overshoot response, thereby counteracting the overshoot response and maintaining concealment.

20. The apparatus of claim 17 wherein the circuit means includes:
means for generating a peak white level signal; and
means for modulating the leading and/or trailing edge of the peak white level signal with the modulation following the sync position modulation.

21. The apparatus of claim 20 including:
means for amplitude modulating the position modulated peak white level signal.

22. The apparatus of claim 17 wherein the circuit means include:
edge fill means receiving the scrambled video signal for generating an edge fill signal by tracking and holding a few last pixels of a video line;
means for position modulating the edge fill signal with the modulation following the sync position modulation to cause the fine mistuning to generate large modulated overshoots;
wherein the output means outputs the position modulated edge fill signal; and
wherein the tuner circuit responds to the large modulated overshoots rather than the fine mistuning to thereby maintain the concealment.

23. The apparatus of claim 22 wherein the circuit means include:
a slew rate amplifier receiving the modulated edge fill signal for increasing the duration of the negative edge thereof.

24. The apparatus of claim 22 wherein the circuit means include:
means for also amplitude modulating the edge fill signal.

25. The apparatus of claim 22 wherein the circuit means include:
means for providing a positional shift signal within the horizontal blanking interval (HBI) vicinity; and
wherein the edge fill means is controlled by the positional shift signal.

26. The apparatus of claim 17 wherein the circuit means include:
a timing circuit responsive to a horizontal blanking interval (HBI) signal for providing a positional shift signal within the HBI vicinity.

27. The apparatus of claim 26 wherein the circuit means include:
oscillator means responsive to the positional shift signal for supplying a position modulated waveform (WAV1) of a few cycles to the output means.

28. The apparatus of claim 26 wherein the circuit means include:
a second timing circuit responsive to the positional shift signal for supplying a re-timed position modulated new sync signal; and
an inverting amplifier for supplying the inverted position modulated new sync signal to the output means.

29. The apparatus of claim 28 including:

low pass filter means integral with the inverting amplifier for rolling off the transient or frequency response of the inverted position modulated new sync signal.

30. The apparatus of claim 28 including:

a third timing circuit responsive to the position modulated new sync signal for supplying timing signal of selected width;

means for providing a continuous wave color subcarrier frequency signal; and logic means responsive to the timing signal to supply a regenerated color burst signal of the selected width to the output means.

31. The apparatus of claim 26 wherein the circuit means include:

fourth timing circuit responsive to the position modulated new sync signal for supplying to the output means an erroneous clamp pulse (ECP) after the new sync signal, which ECP follows the modulation of the new sync signal.

32. The apparatus of claim 26 wherein the circuit means include:

second oscillator means responsive to the position modulated new sync signal for supplying a position modulated waveform (WAV2) of a few cycles to the output means a selected time duration after the new sync signal.

* * * * *